(12) United States Patent
Takishima

(10) Patent No.: US 6,430,113 B1
(45) Date of Patent: Aug. 6, 2002

(54) MAGNETIC HEAD UP/DOWN MECHANISM FOR MAGNETO-OPTICAL DISC DRIVE

(75) Inventor: Suguru Takishima, Saitama-ken (JP)

(73) Assignee: Ashai Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/592,728

(22) Filed: Jun. 13, 2000

(30) Foreign Application Priority Data

Jun. 21, 1999 (JP) .......................................... 11-173757

(51) Int. Cl.[7] .............................................. G11B 13/04
(52) U.S. Cl. ...................................... 369/13.2; 369/77.2
(58) Field of Search ........................ 369/13, 75.2, 77.2, 369/77.1, 75.1, 13.17, 13.2, 13.21, 300, 215; 360/105, 106, 114, 59, 66, 99.06, 255.2, 266.2

(56) References Cited

U.S. PATENT DOCUMENTS

| | | | | |
|---|---|---|---|---|
| 5,122,998 A | * | 6/1992 | Mizuno et al. | 369/13.2 |
| 5,191,562 A | * | 3/1993 | Hensing et al. | 369/13.2 |
| 5,202,861 A | * | 4/1993 | Yoshida | 369/13.2 |
| 5,933,291 A | * | 8/1999 | Kanazawa et al. | 360/99.06 |
| 5,970,037 A | | 10/1999 | Kanazawa et al. | 369/275.2 |
| RE36,709 E | * | 5/2000 | Matsumoto | 369/13 |
| 6,067,207 A | * | 5/2000 | Kurita | 360/105 |
| 6,088,203 A | * | 7/2000 | Nakamura et al. | 360/255.2 |
| 6,243,330 B1 | * | 6/2001 | Oshima | 369/32 |

FOREIGN PATENT DOCUMENTS

| | | |
|---|---|---|
| JP | 54-94007 | 7/1979 |
| JP | 8-55405 | 2/1996 |

* cited by examiner

*Primary Examiner*—Ali Neyzari
(74) *Attorney, Agent, or Firm*—Greenblum & Bernstein, P.L.C.

(57) ABSTRACT

A magnetic head up/down mechanism for an magneto-optical disc drive is provided with a magnetic head supporting member mounting a magnetic head. The supporting member is attached to one end of an elongated plate spring member. A moving system is further provided to move the plate spring member together with the supporting member so that the magnetic head is located either an operative position or a retracted position. The operative position and the retracted position are located between an objective lens of the disc drive and the data recording surface of a magneto-optical disc loaded in the magneto-optical disc drive.

16 Claims, 7 Drawing Sheets

MAGNETIC HEAD UP/DOWN MECHANISM FOR MAGNETO-OPTICAL DISC DRIVE

BACKGROUND OF THE INVENTION

The present invention relates to a magnetic head for a magneto-optical disc drive, and more particularly to an up/down mechanism for moving the magnetic head toward and away from a magneto-optical disc.

Conventionally, a magnetic head is employed in a data recording/reproducing device utilizing a magneto-optical disc or a magnetic disk, for applying a magnetic field to the magneto-optical disc or the magnetic disk. In particular, among various recording/reproducing devices, one employing a floating type magnetic head has been known. The floating type head is constructed such that the head is urged toward the recording medium such as the magneto-optical disc, while, due to the air flow generated by revolution of the recording medium, the head stays at a position a predetermined distance spaced from the data recording surface of the disc.

In such a data recording/reproducing device, there is provided a magnetic head up/down mechanism which moves the magnetic head to locate at either an operative position at which the magnetic head is close to the disc, or at a retracted position at which the magnetic head is spaced from the disc by a relatively large amount.

When the recording medium or a cartridge accommodating the recording medium is loaded or unloaded, the magnetic head is located at the retracted position at which the magnetic head does not interfere the loading/unloading movement of the recording medium or the cartridge. When the recording medium or the cartridge has been loaded, the recording medium is revolved with the magnetic head located at the retracted position, and then, the magnetic head is moved to the operative position. As described above, due to the air flow generated by the revolution of the recording medium, the magnetic head, which is urged toward the recording medium, is located at a position spaced from the data recoding surface of the recording medium by a predetermined amount.

The conventional magnetic head up/down mechanism generally has a lot of parts and a complicated structure, which tends to increase the manufacturing cost.

In particular, in the magneto-optical disc drive, an optical head and a driving unit thereof should also be provided besides the magnetic head and the up/down mechanism, a magnetic head up/down mechanism having a relatively simple structure has been desired.

SUMMARY OF THE INVENTION

It is therefore an object of the present invention to provide an improved magnetic head up/down mechanism having a relatively small number of parts and a simple structure, requiring only a relatively small amount of room to install, and can be inexpensive.

For the above object, according to the present invention, there is provided a magnetic head up/down mechanism for an magneto-optical disc drive, the magneto-optical disc drive recording/reproducing data on a magneto-optical disc, the mechanism being mounted on a carriage movable along a radial direction of the optical disc. Further, the mechanism is provided with a magnetic head, a magnetic head supporting member mounting the magnetic head, an elongated plate spring member, the magnetic head supporting member being secured at an end portion in a longitudinal direction of the plate spring member, and a moving system that moves the plate spring member together with the magnetic head supporting member mounting the magnetic head to move between an operative position and a retracted position, the moving system being located on one side with respect to data recording surface of the magneto-optical disc. It should be noted that the magnetic head is capable of applying magnetic field to the magneto-optical disc when the magnetic head is located at the operative position, and the magnetic head is retracted from the operative position and spaced from the magneto-optical disc when the magnetic head is located at the retracted position.

With this structure, the magnetic head up/down mechanism is constituted with a small number of elements, and can be made compact.

According to another aspect of the invention, there is provided a magnetic head up/down mechanism for a magneto-optical disc drive, the magneto-optical disc drive recording/reproducing data on a magneto-optical disc, the mechanism being mounted on a carriage movable along a radial direction of the optical disc, in which provided are a magnetic head, a magnetic head supporting member mounting the magnetic head, an elongated plate spring member, the magnetic head supporting member being secured at an end portion in a longitudinal direction of the plate spring member, and a moving system that moves the plate spring member together with the magnetic head supporting member mounting the magnetic head to move between an operative position and a retracted position. Further, the magnetic head is capable of applying a magnetic field to the magneto-optical disc when the magnetic head is located at the operative position. The magnetic head can be retracted from the operative position and spaced from the magneto-optical disc when the magnetic head is located at the retracted position. Additionally, the operative position and the retracted position are located between an objective lens of the disc drive and the data recording surface of the magneto-optical disc.

Also with this structure, the magnetic head up/down mechanism can be constituted compact in size with a less number of elements.

Optionally, in either of the above structures, the moving system may include a body member rockable about an axis that is parallel with the data recording surface of the magneto-optical disc, the other end of the elongated plate spring being secured to the body member, and a driving system that is actuated to drive the body member to rotate so that the magnetic head is moved between the operative position and the retracted position.

Further, the moving system may include a holding system that holds the body member when the driving system is deactuated. The driving system can be deactuated when the magnetic head has been moved to one of the operative position and the retracted position from the other one of the operative position and the retracted position.

In a specific example, the moving system may include a permanent magnet provided on the body member. The N pole and S pole of the permanent magnet should be arranged in a direction in which the body member rocks. Further, a magnetic field generator is provided on the carriage, the magnetic field generator facing the permanent magnet. With this structure, the body member may be biased to rotate such that the magnetic head is moved toward one of the operative position and the retracted position depending on the magnetic field generated by the magnetic field generator.

Alternatively, the moving system may be constituted to such that a permanent magnet is provided on the carriage, and a magnetic field generator is provided on the body member. Also with this structure, the body member can be biased to rotate such that the magnetic head is moved toward one of the operative position and the retracted position depending on the magnetic field generated by the magnetic field generator.

Optionally, the magnetic field generator may include a first magnetic member and a second magnetic member. The first and second magnetic members are arranged along a direction in which the body member rocks, and the first magnetic member may be closer to the S pole of the permanent magnet when the magnetic head is located at one of the operative position and the retracted position than a case in which the magnetic head is located at the other one of the retracted position and the operative position, while the second magnetic member may be closer to the N pole of the permanent magnet when the magnetic head is located at the other of operative position and the retracted position than a case in which the magnetic head is located at the one of the operative position and the retracted position.

Further optionally, when the magnetic head is located at the one of the operative position and the retracted position, the body member may stay at a current position due to attractive force between the S pole of the permanent magnet and the first magnetic member, and when the magnetic head is located at the other of the operative position and the retracted position, the body member stays at a current position due to attractive force between the N pole of the permanent magnet and the second magnetic member.

Further optionally, that the carriage mounting the magnetic head up/down mechanism may also mount an objective lens.

DESCRIPTION OF THE ACCOMPANYING DRAWINGS

DESCRIPTION OF THE EMBODIMENT

Hereinafter, an embodiment of the invention will be described with reference to the accompanying drawings.

Figure 1:
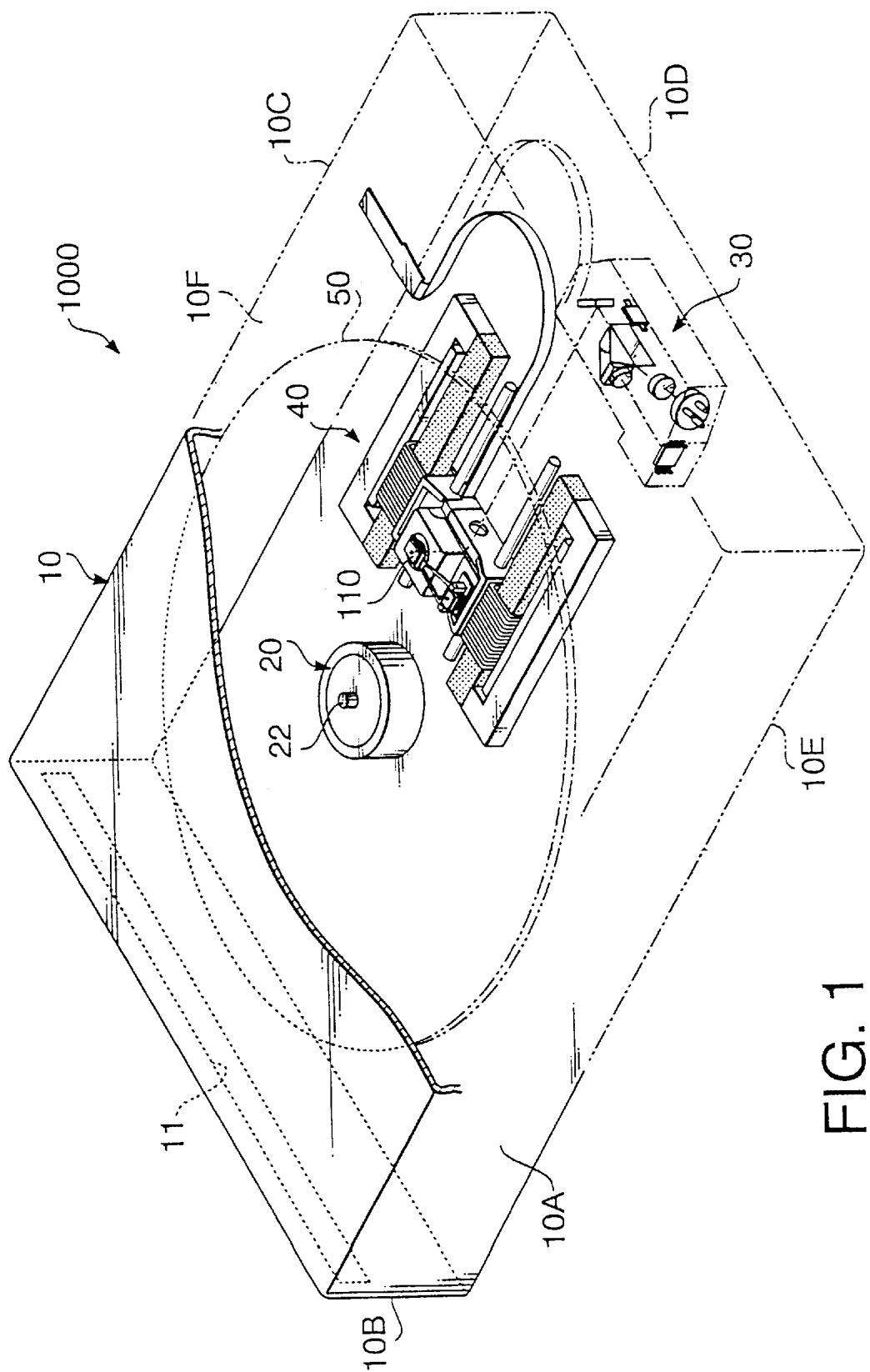
FIG. 1 is a perspective view of a magneto-optical disc drive employing a magnetic head up/down mechanism, according to an embodiment of the present invention.

FIG. 1 is a perspective view of a magneto-optical disc drive (hereinafter, referred to as a disc drive) 1000 employing a magnetic head up/down mechanism, according to an embodiment of the present invention.

The disc drive 1000 has a housing 10 which accommodates a spindle motor 20, a stationary optical system 30, and a movable optical system 40.

The housing 10 has a rectangular bottom plate 10A, side walls 10B, 10C, 10D and 10E, and an upper plate 10F which is shown as partially broken.

An elongated rectangular disc insertion opening 11 is formed on the side wall 10B. The direction of the elongation of the disc insertion opening 11 is parallel with its longer side. A cartridge 52 accommodating a magneto-optical disc 50 is to be inserted through the opening 11.

Figure 5:
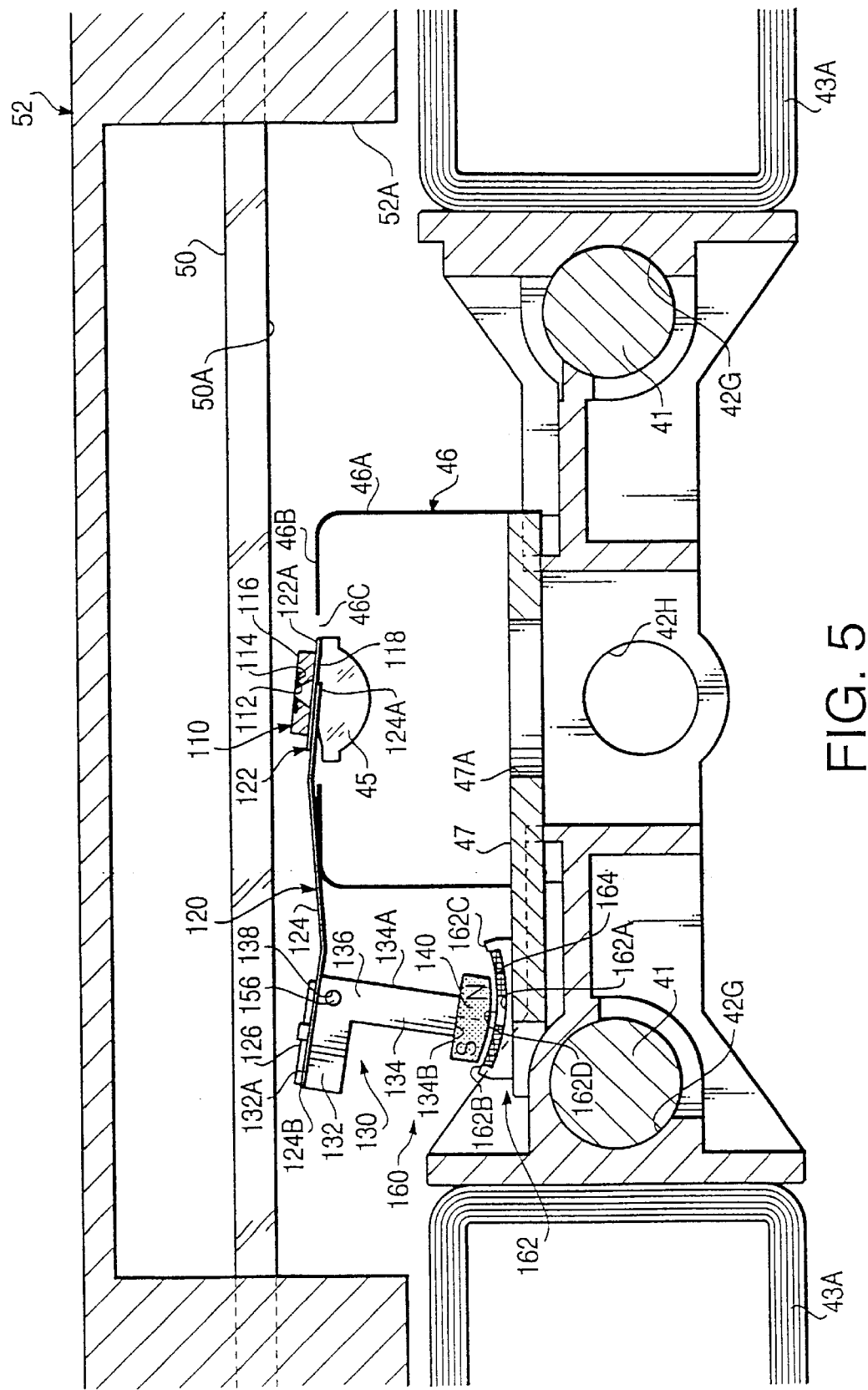
FIG. 5 is a cross sectional view showing a condition where the magnetic head is located at an inoperative position.
Figure 6:
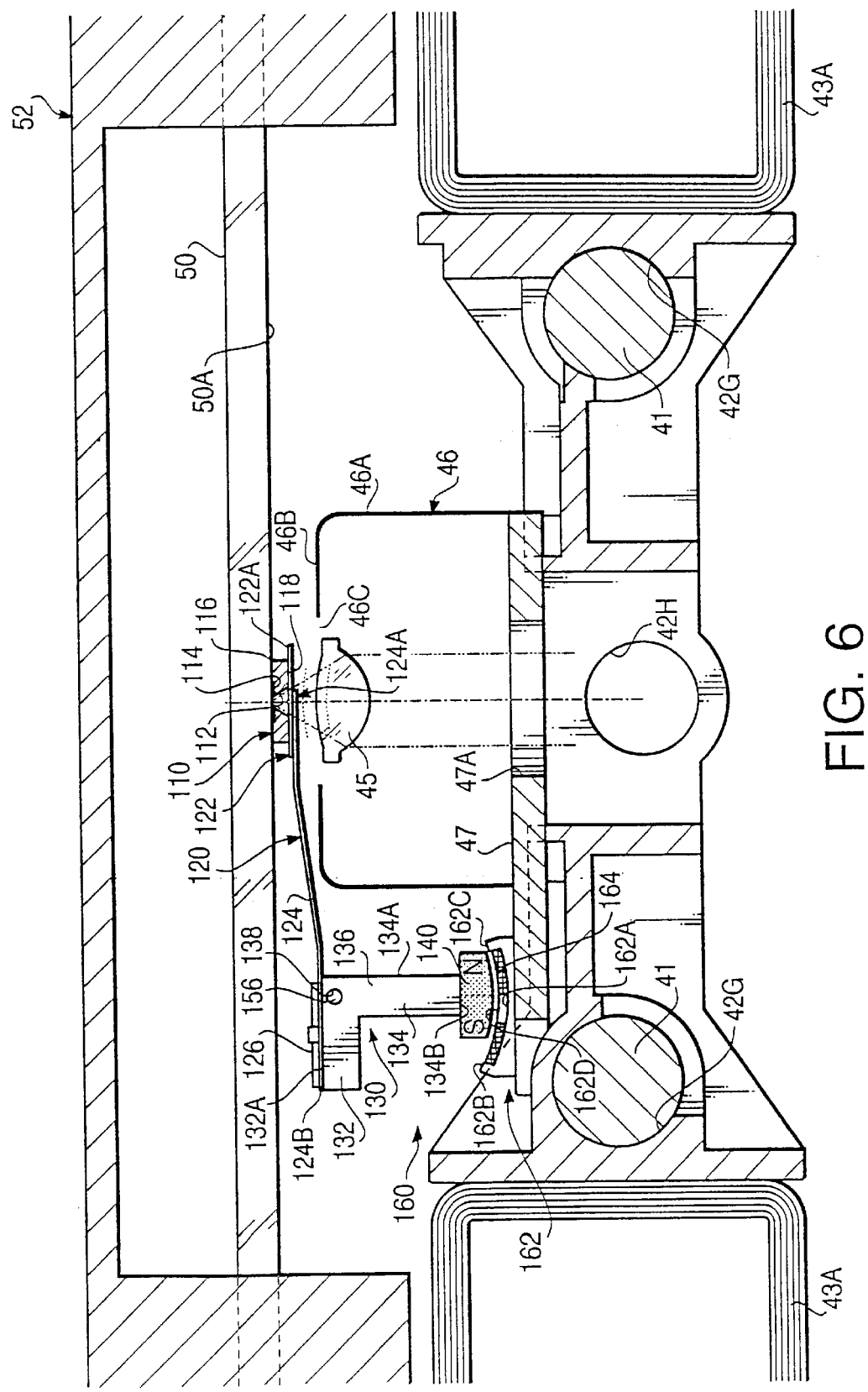
FIG. 6 is a cross sectional view showing a condition where the magnetic head is located at an operative position.
Figure 7:
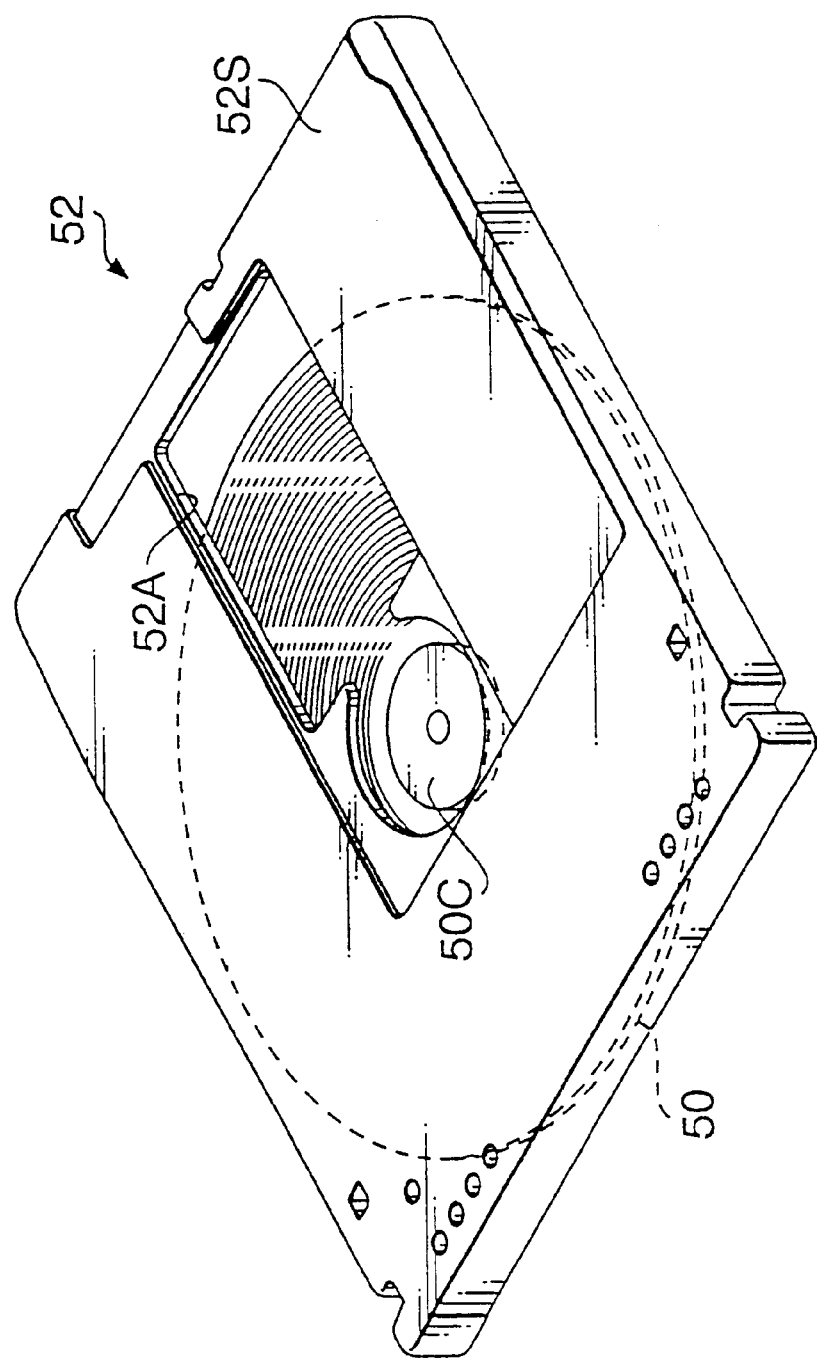
FIG. 7 is shows an appearance of a disc cartridge.

FIG. 7 shows the cartridge 52 from the bottom. As shown in FIG. 7, the cartridge 52 is provided with a shutter 52S covering an opening 52A. The shutter 52S is opened by a loading mechanism (not shown) of the disc drive 1000 when the cartridge 52 is loaded in the disc drive 1000 so that the magneto-optical disc 50 accommodated therein is exposed through the opening 52A. As shown in FIGS. 5 and 6, a data recording surface 50A of the-magneto-optical disc 50 faces the movable optical system 40 via an opening 52A of the cartridge 52 when data recording/reproducing operation is to be performed.

The spindle motor 20 has a spindle 22 and a chuck portion provided at a motor side of the spindle 22. Specifically, a magnet, for example, a disk-shaped magnet having a hole fitted on the spindle 22 is provided at the chuck portion. When the cartridge 52 is loaded, the magnet of the spindle motor 20 (i.e., the chuck portion) attracts a hub 50C (see FIG. 7), which is formed of magnetic material and is provided at the center of the disc 50, to hold the disc 50.

Figure 2:
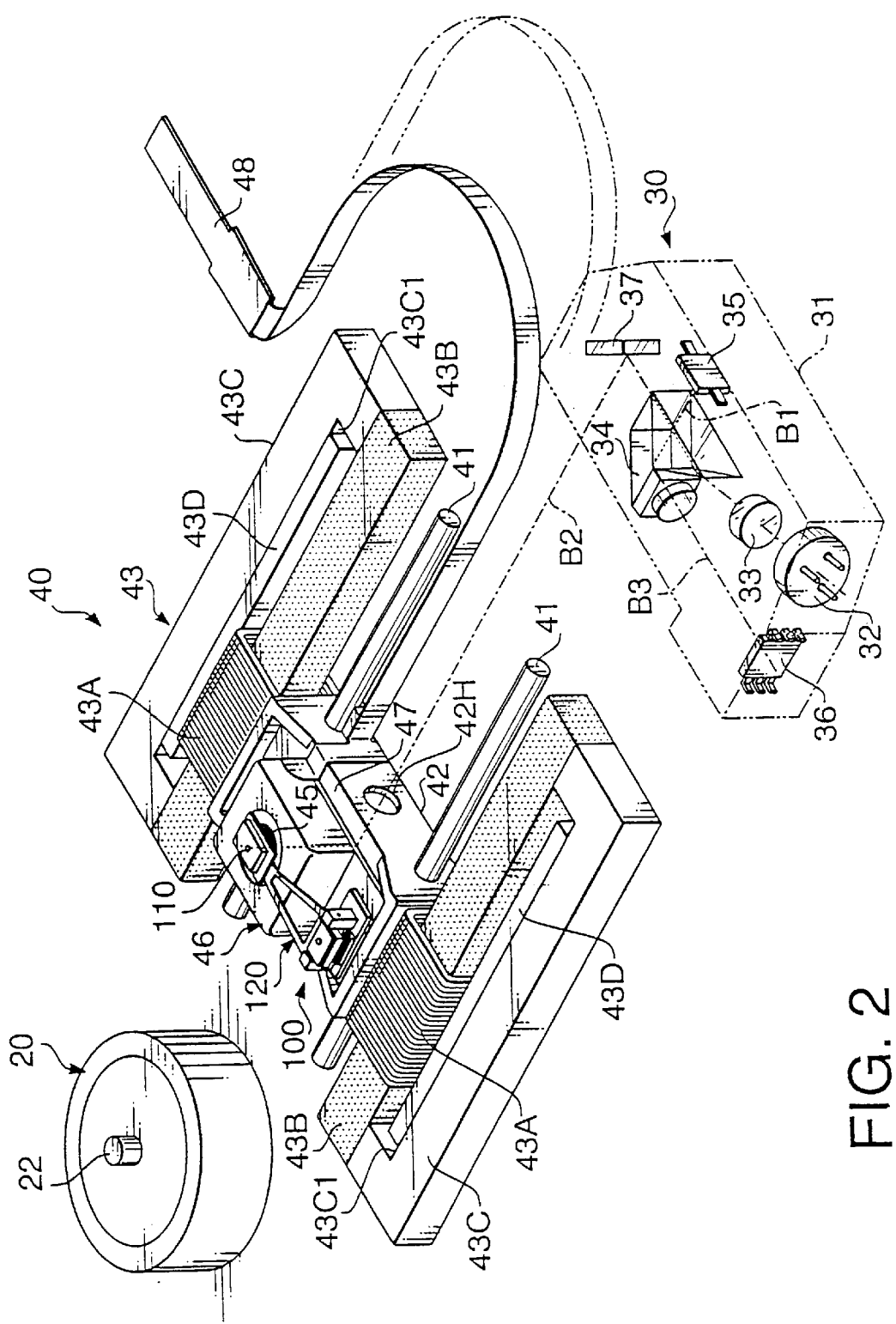
FIG. 2 is an enlarged perspective view of the magnetic head, movable and stationary optical systems employed in the magneto-optical disc drive shown in FIG. 1.

As shown in FIG. 2, the stationary optical system 30 has a casing 31 which is securely mounted on the bottom plate 10A. The casing 31 accommodates a laser diode 32, a collimating lens 33, a prism 34, an APC (Automatic Power Control) sensor 35, a light receiving element 36 and a mirror 37.

A laser beam emitted by the laser diode 32 passes through the collimating lens 33 and is incident on the prism 34. The prism 34 splits the incident beam into a first beam which is directed to the APC sensor 35 along a first optical path B1 and a second beam which is directed to the prism 44 (see FIG. 4) via the mirror 37 along a second optical path B2. Further, a beam reflected by the disc 50 which proceeds back along the second optical path B2 is incident on the prism 34, and then is directed to the light receiving element 36 along a third optical path B3.

A line extending the optical path from the mirror 37 to the prism 44 intersects a rotation axis of the spindle 22 at a right angle. That is, the extending line of the optical path from the mirror 37 to the prism 44 is parallel with a diameter of the disc 50.

The power of the beam emitted by the laser diode 32 is controlled in accordance with an output of the APC sensor 35, which is well-known as an APC operation.

Output signals of the light receiving element 36 are treated as a data signal, a focusing control signal, and a tracking control signal.

Figure 3:
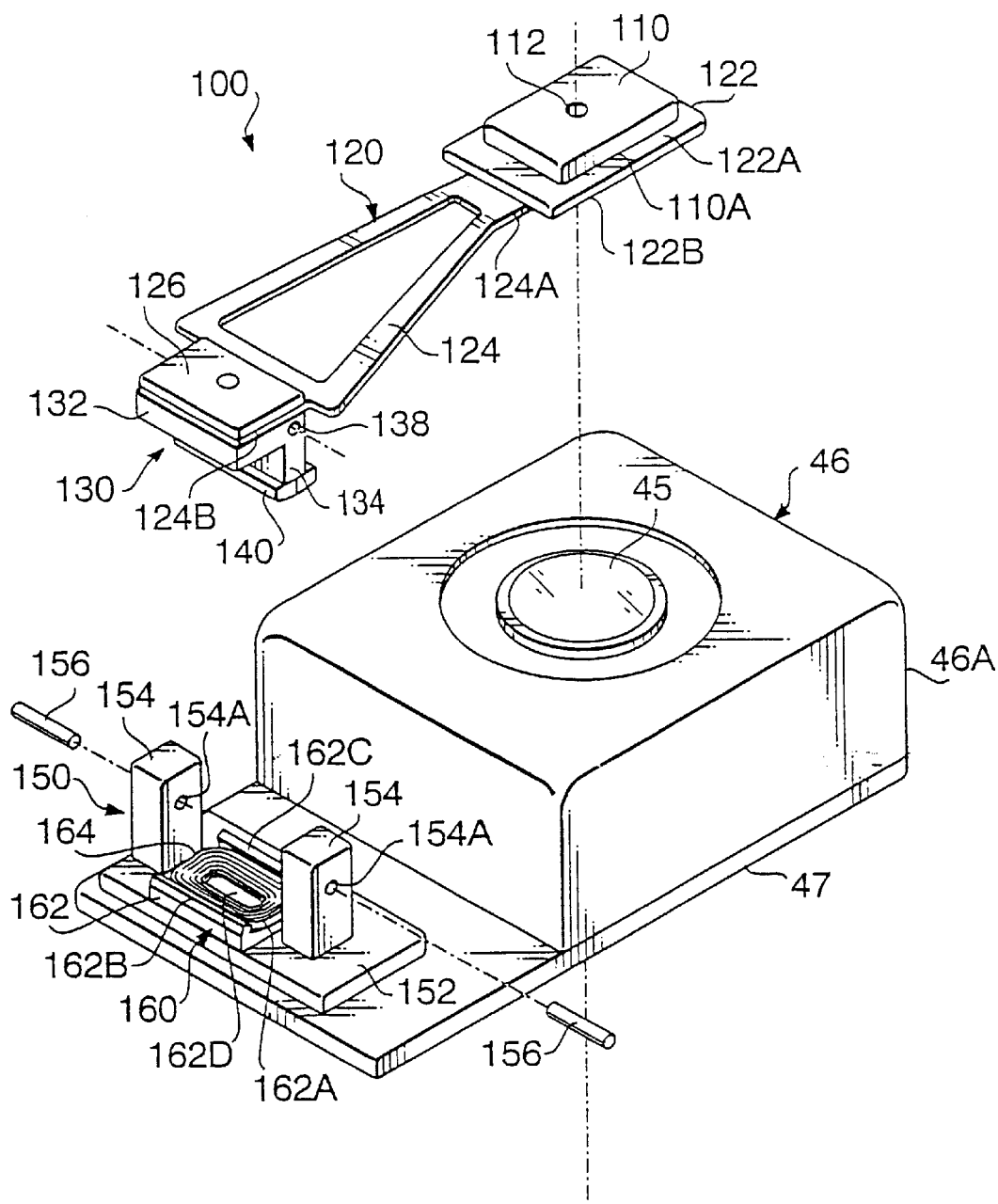
FIG. 3 is an exploded perspective view of the magnetic head up/down mechanism and the movable optical system.
Figure 4:
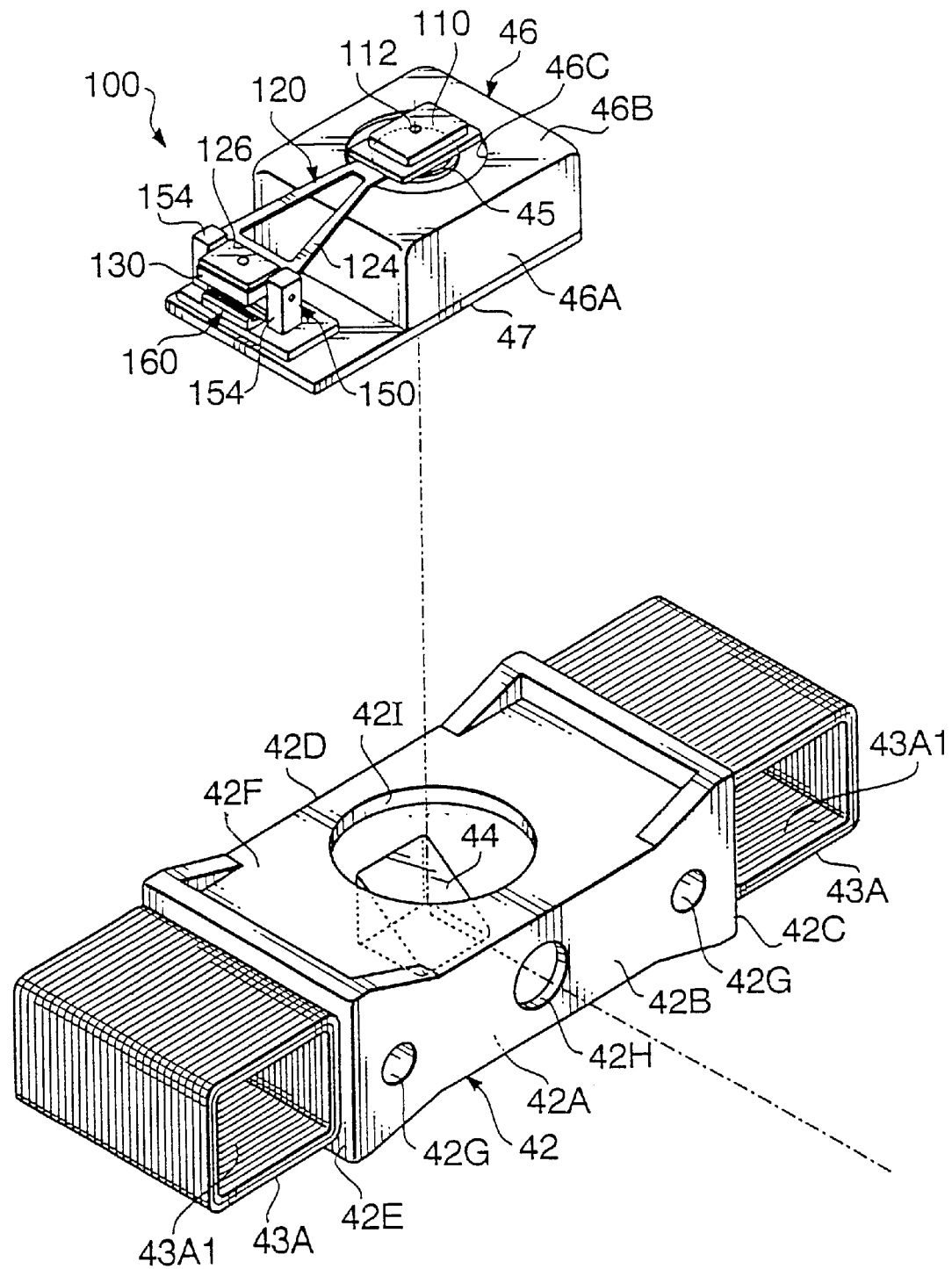
FIG. 4 is a perspective view of the magnetic head up/down mechanism and a carriage mounting the movable optical system.

As shown in FIGS. 2, 3 and 4, the movable optical system 40 is provided with a pair of guide shafts 41, a carriage 42, a linear motor unit 43, the prism 44, an objective lens 45, an objective lens actuator unit 46, a support plate 47 and the magnetic head up/down mechanism 100.

The pair of guide shafts 41 are secured on the bottom plate 10a via not shown securing members such that the pair of shafts 41 are spaced from the bottom plate 10A by a predetermined distance, parallel to each other, parallel to the surface of the bottom plate 10A, and parallel to the optical axis B2 between the mirror 37 and the prism 44.

As shown in FIG. 4, the carriage 42 has a rectangular bottom plate 42A, and side walls 42B, 42C, 42D and 42E, and a rectangular upper plate 42F which is secured to the upper ends of the side walls 42B, 42C, 42D and 42E. The side wall 42B faces the stationary optical system 30 (see FIG. 2).

On the side wall 42B and the opposite side wall 42D, a pair of through holes 42G, through which the guide shafts 41 are inserted, are formed. Thus, the carriage 42 is reciprocally movable along a diameter of the disc 50 while being guided by the guide shafts 41.

Further, as shown in FIGS. 2 and 4, at a substantially central portion of the side wall 42B, an opening 42H is formed, and at a substantially central portion of the upper plate 42F, another opening 42I is formed. The prism 44 is accommodated in the carriage 42 such that:

(1) a beam directed from the mirror 37 and passes through the opening 42H is reflected by the reflection surface of the prism 44 and is emerged from the opening 42I toward the disc 50 via the objective lens 45; and (2) a beam reflected by the disc 50 and passed through the objective lens 45 is incident on the reflection surface of the prism 44 through the opening 42I, and is directed to the mirror 37 through the opening 42H.

The linear motor unit 43 includes a pair of coils 43A, a pair of inner yokes 43B, a pair of outer yokes 43C, and a pair of magnets 43D, as shown in FIG. 2.

The pair of coils 43A are secured onto the outer surfaces of the side walls 42C and 42E, respectively. Each coil 43A is formed to have windings around an axis that extends in a direction parallel to the guide shafts 41.

The inner yokes 43B are located outside the pair of guide shafts 41. Each of the inner yokes 43B is inserted through a central opening 43A1 of the coil 43A. The inner yokes 43B are arranged parallel with the guide shafts 41.

The outer yokes 43C are located outside the inner yokes 43B as shown in FIG. 2 with a predetermined clearance between the inner yoke 43B and the outer yoke 43C. Portions other than the both ends portion of the outer yokes 43C are also parallel with the guide shafts 41. Both ends of each outer yoke 43C are formed to bent toward the inner yoke 43B, and are connected with the respective ends of the inner yoke 43B.

Each of the magnets 43D is secured on a side surface 43C1, which is a surface of the outer yoke 43C and faces the inner yoke 43B, along the longitudinal direction thereof. There is a clearance between the magnet 43D and the inner yoke 43B so as to allow the coil 43A to move along the inner yoke 43B.

A linear motor circuit is constructed with the pair of inner yokes 43B, the pair of outer yokes 43C, and the pair of magnets 43D. When an electrical current flows through the coils 43A, the coils 43A linearly moves along the inner yokes 43B.

The supporting plate 47 is secured on the upper surface of the upper plate 42F of the carriage 42. On the supporting plate 47, the objective lens actuator 46 and the magnetic head up/down mechanism 100 are mounted.

The objective lens actuator 46 has a casing 46A. On the upper surface 46B of the casing 46A, an opening 46C is formed. The objective lens actuator 46 holds the objective lens 45 so as to face the opening 46C. In accordance with a control signal transmitted from a controller (not shown) via a flexible circuit board 48, the objective lens actuator 46 moves the objective lens 45 along its optical axis (i.e., in a direction of the thickness of the optical disc 50) for focusing, and moves the objective lens 45 in a direction parallel to a radial direction of the disc 50 for tracking. Such a configuration is well known, example of which being disclosed in Japanese Patent Provisional Publication SHO 54-94007.

An opening 47A is formed on the supporting plate 47 as shown in FIGS. 5 and 6. The laser beam emitted from the stationary optical system 30 and reflected by the reflection surface of the prism 44 is directed to the objective lens 45 through the opening 47A.

FIG. 3 is an exploded perspective view of the magnetic head up/down mechanism 100 and the movable optical system 40. FIG. 4 is a perspective view of the magnetic head up/down mechanism 100 and the carriage 42.

The magnetic head up/down mechanism 100 includes a magnetic head 110, a plate spring member 120, a body member 130, a permanent magnet 140, a supporting member 150 and a magnetic field generator 160.

The magnetic head 110 has a shape of a rectangular flat plate. At a substantially central portion on the magnetic head 110, a through hole 112 is formed. Inside the magnetic head 110, a circularly wound coil 114 is provided about the central axis of the through hole 112. The magnetic head 110 is secured onto an end of the plate spring member 120 such that the upper surface 116 of the magnetic head 110 faces the magneto-optical disc 50, and that the lower surface 118 faces the objective lens 45. When the data recording operation is performed, an electrical current flows through the coil 114 so that a magnetic field is applied to the magneto-optical disc 50 at a portion facing the magnetic head 110.

The magnetic head supporting member 122 has a shape of a rectangular flat plate. The lower surface 118 of the magnetic head 110 is adhered on the upper surface 122A of the supporting plate 122.

The plate spring body 124 is an elongated member having elasticity. On an upper surface at one end portion 124A, along its longitudinal direction, the lower surface 122B of the supporting member 122 is secured. The other end portion 124B, along the longitudinal direction, of the plate spring body 124 is secured onto the upper surface 132A (see FIG. 5) of the upper portion 132 of the body member 130 and sandwiched between the upper surface 132A and a fixing member 126.

The body member 130 has an upper part 132, and a lower portion 134 which extends downward from a side of the upper part 132, and has an L-shaped cross section when viewed from the front as shown in FIG. 5.

The body member 130 is arranged such that the upper surface 132A of the upper part 132 faces the recording medium 50 and a side surface 134A of the lower part 134, which is perpendicular to the upper surface 132A, faces the objective lens actuator 46. At a lower end 134B of the lower part 134, a permanent magnet 140 is provided.

A bearing hole 138 is formed at an intermediate portion between the upper part 132 and the lower part 134, in a direction parallel to the upper and lower surfaces 132A and 134A.

The supporting member 150 includes a base 152, two columns 154, and two supporting shafts 156.

The base 152 has a rectangular shape, the lower surface thereof being secured on the upper surface of the supporting plate 47.

The two columns 154 are secured on the base 152 such that the two columns 154 stand upright with respect to the upper surface of the base 152, and spaced from each other in the longitudinal direction of the base 152.

The two supporting shafts 156 are inserted through two through holes 154A formed on the two columns 154, respectively. The pair of through holes 154A are formed at corresponding positions of the two columns 154, and aligned along a single line (axis). Each of the two supporting shafts 156 protrude from respective through holes 154A towards the other supporting shaft 156.

The body member 130 is rotatably supported, between the columns 154, by the shafts 156 which are inserted through the bearing holes 138 as well as the through holes 154A.

The axis of each supporting shaft 156 extends in a direction parallel with the data recording surface of the recording medium 50.

The magnetic field generator 160 includes yoke 162 and a coil 164.

The yoke member 162 is provided on the base 152 between the columns 154. A surface 162A of the yoke 162 is cylindrically centered around a line connecting the axes of the supporting shafts 156. Both sides parallel to the axes of the supporting shafts 156 are formed to be first and second magnetic protrusions 162B and 162C which protrude toward the line connecting the axes of the supporting shaft 156 (see FIG. 5). Further, a protrusion 162D is formed at a central portion of the surface 162A. The protrusion 162D extends in a direction parallel to the axes of the shafts 156.

The coil 164 is provided, on the surface 162A, between the first and second magnetic protrusions, wound around the protrusion 162D. The coil 164 faces the permanent magnet 140 with a predetermined clearance therebetween. The central axis of the coil 164 extends in a direction of the thickness of the recording medium 50.

With the above configuration, when the electrical current flows through the coil 164, the magnetic field generated by the coil 164 is transferred via the yoke member 162 to the first and second magnetic protrusions 162B and 162C, which exhibit the same magnetic polarity.

When the direction of the electrical current flowing in the coil 164 is reversed, the magnetic polarity of the first and second magnetic protrusions 162B and 162C is reversed.

The permanent magnet 140 is provided such that, when the body member 130 is rotatably supported by the supporting member 150, the N pole and the S pole are located along the rotatable direction of the body member 130 (i.e., in a direction perpendicular to the axes of the shafts 156).

Hereinafter, the operation of the magnetic head up/down mechanism 100 constructed as above will be described.

Firstly, operation, from the insertion of the cartridge into the disc drive 1000 before the recording/reproducing operation starts, will be described.

At an initial stage, the cartridge 52 is not inserted in the insertion opening 11 of the disc drive 1000. The carriage 42 has been located at an initial position by the movement of the linear motor unit 43, and the spindle motor 20 is not rotated.

The magnetic field generator 160 is not actuated. Therefore, the yoke member 162, the first and second magnetic protrusions 162B and 162C are magnetized as affected by the magnetic field of the permanent magnet 140. As a result, the body member 130 is attracted by the first and second magnetic protrusions 162B and 162C, and located at its neutral position.

When an electrical current having a predetermined magnitude is supplied to the coil 164 of the magnetic field generator 160, the coil 164 generates a magnetic field. In this embodiment, the electrical current flows from the back to front of the surface of FIG. 5 in the portion of the coil 164 located between the first magnetic protrusion 162B and the protruded potion 162D; and front to back in the portion of the coil 164 located between the protruded portion 162D and the second magnetic protrusion 162C (which will be referred to as first direction, and the opposite direction will be referred to as a second direction). It should be noted that the magnitude of the electrical current is such that the magnetic field generated by the coil 164 as the electrical current flows is sufficiently greater than the magnetic field of the permanent magnet 140. The yoke 162 and the first and second magnetic protrusions 162B and 162C are magnetized by the magnetic field to exhibit N pole. It should be noted that in this embodiment, the N pole of the permanent magnet 140 is on the magnetic head side, and the S pole is on the other side. Therefore, at this stage, the magnetic protrusions 162B and 162C are magnetized to exhibit the N pole.

When the electrical current flows in the coil 164 in the first direction as described above, the body member 130 is rotated clockwise in FIG. 5 to locate at a second position, which is shown in FIG. 5. Thus, the magnetic head 110 secured onto the plate spring member 120 is located at a retracted position, at which the magnetic head 110 is sufficiently spaced from the data recording surface 50A of the recording medium 50 and close to the objective lens 45.

After the magnetic head 110 has been located at the retracted position, supply of the electrical current to the coil 164 is terminated. Then, the first magnetic protrusion 162B exhibits the N pole as affected by the magnetic field of the permanent magnet 140. That is, the S pole of the permanent magnet 140 and the first magnetic protrusion 162B attract to each other. Accordingly, the body member 130 remains to stay at the second position, and therefore, the magnetic head 110 remains to stay at the retracted position.

After the above procedure is finished, the disc drive 1000 can accept the disc cartridge 52.

When the cartridge 52 accommodating the recording medium 50 is inserted through the insertion opening 11, the controller starts loading of the cartridge 52. That is, the controller controls a well-known loading mechanism inside the disc drive 1000, and locates the same at a predetermined position at which the hub 50C of the recording medium 50 is caught by the chucking portion at the spindle 22 of the motor 20. The shutter 52S for covering the opening 52A of the cartridge 52 is opened during the loading operation, and when the cartridge 52 is located at the predetermined position (i.e., the loading has been finished), the data recording surface 50A is exposed to the magnetic head 110 as shown in FIG. 5.

Specifically, the cartridge 52 partially inserted in the disc drive 1000 through the insertion opening 11 is withdrawn along a direction parallel to the data recording surface 50A, during which the shutter 52S covering the opening 52A, which corresponds to the moving range of the carriage 42. Then, the cartridge 52 is moved down so that the data recording surface 50A is located close to the magnetic head 110, and the hub 50C of the recording medium 50 is attracted by the magnet of the chucking portion provided to the spindle 22 of the motor 20.

The retracted position of the magnetic head 110 is designed such that the magnetic head 110 does not interfere the movement as describe above (i.e., a loading/unloading movement) of the cartridge 52. Therefore, the magnetic head 110 is prevented from contacting the moving cartridge and being broken. Of course, with this structure, the magnetic head 110 located at the retracted position does not contact the disc 50.

When the cartridge 52 has been located at the predetermined (loaded) position, the spindle motor 20 is driven to rotate and the disc 50 is rotated.

After the rotation of the disc 50 is stabilized, the electrical current having the opposite direction (i.e., the second direction) provides for the body member 130 to be moved to the second position. With this current, the first and second magnetic protrusions 162B and 162C exhibit the S pole.

Then, the S pole of the permanent magnet 140 is applied with a force that moves the S pole of the permanent magnet 140 away from the first magnetic protrusion 162B, while the N pole of the permanent magnet 140 is attracted by the second magnetic protrusion 162C. As a result, the body member 130 rotates counterclockwise from a position shown in FIG. 5, and is located at a first position as shown in FIG. 6. The magnetic head 110 secured to the plate spring member 120 is located at an operable position at which the magnetic head 110 almost contacts the data recording surface 50A but spaced therefrom by a predetermined amount due to the air flow generated by the rotation of the disc 50.

When the magnetic head 110 has been located at the operable position, the supply of the electrical current to the coil 164 is stopped. Then, the second magnetic protrusion 162C exhibits the S pole as affected by the magnetic field of the permanent magnet 140. That is, the N pole of the permanent magnet 140 and the second magnetic protrusion 162C attract each other. Accordingly, the body member 130 remains at the first position, and therefore, the magnetic head 110 remains at the operable position.

As described above, the magnetic head 110 almost contacts the data recording surface 50A, but spaced therefrom by a predetermined amount due to the air flow generated by the rotation of the disc 50. Thus, the plate spring 124 is elastically deformed in a direction where the magnetic head 110 is moved away from the data recording surface 50A. Therefore, the final position of the magnetic head 110 is a position where the force which is produced by the air flow to move the magnetic head 110 away from the disc 50 and the elastic force of the plate spring 124 balance. When the magnetic head 110 is located at the above-described balanced position, the distance between the magnetic head 110 and the data recording surface 50A of the disc 50 is very small, for example, 10 μm or less.

Then, the controller controls the linear motor unit 43 to move the carriage 42 along a diameter of the disc 50 so that the optical axis of the objective lens is located at a desired position on the data recording surface 50A of the disc 50. After the above-described operation has been finished, the hole 112 of the magnetic head 110 is located on the optical axis of the objective lens 45. With this condition, by driving the laser diode 30, the laser beam is emitted by the laser diode 30 and incident on the data recording surface 50A via the second optical path B2, objective lens 45 and the hole 112.

By supplying the electrical current having a predetermined magnitude to the coil 114 of the magnetic head 110, the magnetic field can be applied, on the data recording surface 50A, at a position where the laser beam is incident.

It should be noted that the intensity of the laser beam is varied depending on whether data is to be recorded or reproduced, and the magnetic field is applied only when the data is recorded. Since the control of the laser beam and magnetic head 110 for recording/reproducing data is well known and is not the essential feature of the present invention, description thereof will be omitted.

Next, the operation after the recording/reproducing of data is finished will be described.

When the recording/reproducing operation is finished, the controller is instructed to eject the cartridge 52.

Then, the electrical current of the first direction is supplied to the coil 164 so that the first and second magnetic protrusions 162B and 162C exhibit the N pole. Then, the body member 130 located at the first position as shown in FIG. 6 rotates clockwise to the second position as shown in FIG. 5, and therefore the magnetic head 110 is located at the retracted position. Thereafter, the supply of the electrical current to the coil 164 is stopped. However, as described above, since the first magnetic protrusion 162B and the permanent magnet 140 attract each other, the body member 130 stays at the second position, and therefore the magnetic head 110 stays at the retracted position.

Then, the spindle motor 20 stops rotating, and the rotation of the disc 50 stops.

At this stage, the loading mechanism is controlled to unload the cartridge 52.

Specifically, the hub 50C of the disc 50 is released from the chucking portion of the spindle 22 of the motor 20, the cartridge 52 is moved upward so as to be away from the magnetic head 110. Then, the cartridge 52 is moved horizontally so as to be ejected from the insertion opening 11, during which the shutter 52S of the cartridge 52 is moved to close the opening 52A.

During the unloading operation described above, since the magnetic head 110 stays at the retracted position, it does not contact the cartridge 52 or the disc 50, they will not break due to contact therebetween.

As described, the magnetic head 110 is moved between the retracted position and the operable position. Both the retracted position and the operable position are located between the objective optical system and the data recording surface 50A of the disc 50. In other words, the magnetic head up/down mechanism 100 is located on one side with respect to the surface of the disc 50.

According to the above structure, the magnetic head up/down mechanism 100 can be constituted by a relatively small number of elements including the magnetic head 110, the plate spring member 120, the body member 130, the permanent magnet 140, the supporting member 150 and the magnetic field generator 160. Further, the magnetic head up/down mechanism 100 can be constructed as a relatively small unit. Thus, the magnetic head up/down mechanism 100 according to the embodiment of the invention can be compact in size and inexpensive.

Further, the current supply to the coil 164 of the magnetic field generator 160 is performed only when the body member 130 is moved from the first position to the second position, and from the second position to the first position, and when the body member 130 stays at each position the electrical current is not supplied to the coil 164. Therefore, consumption of the electric power is suppressed.

Furthermore, since the N and S poles of the permanent magnet 140 are arranged in the direction where the permanent magnet swings, and the first and second magnetic protrusions 162B and 162C are magnetized to have the same polarity when the electrical current is supplied to the coil 164, when the body member 130 is moved, the repulsive force is applied between the permanent magnet 140 and one of the first and second magnetic protrusions 162B and 162C, and the attractive force is applied between the permanent magnet 140 and the other of the first and second magnetic protrusions 162B and 162C. Therefore, the electrical current to be supplied to the coil 160 for moving the body member 130 can be suppressed.

It should be noted that the protruded portion 162D around which the coil 164 is wound need not be formed of the same material as the yoke 162. For example, material which has sufficiently less magnetic characteristics can be secured on the surface 162A of the yoke 162. Alternatively, a formed coil may be secured, by an adhesive agent or the like, on the surface 162A of the yoke 162, without utilizing protruded potion 162D. With such a structure, the effect of the magnetic field produced about the central portion of the coil 164 can be ignored.

In the embodiment, the permanent magnet 140 is provided on the body member 130, and a magnetic field generator 160 is provided on the carriage 42. However, the invention is not limited to this configuration, and the permanent magnet can be provided on the carriage, with the magnetic field generator being provided on the body member. Also with this structure, the body member can be biased to rotate such that the magnetic head is moved toward one of the operative position and the retracted position depending on the magnetic field generated by the magnetic field generator.

The present disclosure relates to the subject matter contained in Japanese Patent Application No. HEI 11-173757, filed on Jun. 21, 1999, which is expressly incorporated herein by reference in its entirety.

What is claimed is:

1. A magnetic head up/down mechanism for a magneto-optical disc drive, the magneto-optical disc drive recording/reproducing data on a magneto-optical disc, said mechanism being mounted on a carriage movable along a radial direction of said magneto-optical disc, said mechanism comprising:
   a magnetic head;
   a magnetic head supporting member mounting said magnetic head;
   an elongated plate spring member, said magnetic head supporting member being secured at an end portion in a longitudinal direction of said elongated plate spring member; and
   a moving system that moves said elongated plate spring member together with said magnetic head supporting member mounting said magnetic head to move between an operative position and a retracted position, said moving system being located on one side with respect to data recording surface of said magneto-optical disc,
   wherein said magnetic head is capable of applying magnetic field to said magneto-optical disc when said magnetic head is located at said operative position,
   wherein said magnetic head is retracted from said operative position and spaced from said magneto-optical disc when said magnetic head is located at said retracted position, and
   wherein said magnetic head is located on a data recording surface side of said magneto-optical disc at each of said operative position and said retracted position.

2. The mechanism according to claim 1, wherein said moving system includes:
   a body member rockable about an axis that is parallel with the data recording surface of said magneto-optical disc, the other end of said elongated plate spring member being secured to said body member; and
   a driving system that is actuated to drive said body member to rotate so that said magnetic head is moved between said operative position and said retracted position.

3. The mechanism according to claim 2, wherein said moving system further includes a holding system that holds said body member when said driving system is deactuated, said driving system being deactuated when said magnetic head has been moved from one of said operative position and said retracted position to the other one of said operative position and said retracted position.

4. The mechanism according to claim 3, wherein said driving system includes:
   a permanent magnet provided on one of said body member and said carriage, the N pole and S pole of said permanent magnet being arranged in a direction in which said body member rocks;
   a magnetic field generator provided on the other of said body member and said carriage, said magnetic field generator facing said permanent magnet,
   said body member being biased to rotate such that said magnetic head is moved toward one of said operative position and said retracted position depending on the magnetic field generated by said magnetic field generator.

5. The mechanism according to claim 4, wherein said magnetic field generator includes:
   a first magnetic member;
   a second magnetic member, said first and second magnetic member being arranged along a direction in which said body member rocks, and
   said first magnetic member being closer to said S pole of said permanent magnet when said magnetic head is located at one of said operative position and said retracted position than a case in which said magnetic head is located at the other one of said retracted position and said operative position,
   said second magnetic member being closer to said N pole of said permanent magnet when said magnetic head is located at said the other of operative position and said retracted position than a case in which said magnetic head is located at said one of said operative position and said retracted position.

6. The mechanism according to claim 5,
   wherein when said magnetic head is located at said one of said operative position and said retracted position, said body member remains at a current position due to attractive force between said S pole of said permanent magnet and said first magnetic member, and
   wherein when said magnetic head is located at the other of said operative position and said retracted position, said body member remains at a current position due to attractive force between said N pole of said permanent magnet and said second magnetic member.

7. The mechanism according to claim 3, said carriage further mounting an objective lens of said disc drive.

8. A magnetic head up/down mechanism for a magneto-optical disc drive, the magneto-optical disc drive recording/reproducing data on a magneto-optical disc, said mechanism being mounted on a carriage movable along a radial direction of said magneto-optical disc, said mechanism comprising:
   a magnetic head;
   a magnetic head supporting member mounting said magnetic head;
   an elongated plate spring member, said magnetic head supporting member being secured at an end portion in a longitudinal direction of said elongated plate spring member; and
   a moving system that moves said elongated plate spring member together with said magnetic head supporting member mounting said magnetic head to move between an operative position and a retracted position,
   wherein said magnetic head is capable of applying magnetic field to said magneto-optical disc when said magnetic head is located at said operative position, wherein said magnetic head is retracted from said operative position and spaced from said magneto-optical disc when said magnetic head is located at said retracted position, wherein said operative position and said retracted position are located between an objective lens of said disc drive and a data recording surface of said magneto-optical disc, and wherein said magnetic head is located one of adjacent to and close to the objective lens when said magnetic head is located at the retracted position.

9. A magnetic head up/down mechanism for a magneto-optical disc drive, the magneto-optical disc drive recording/reproducing data on a magneto-optical disc, said mechanism being mounted on a carriage movable along a radial direction of said magneto-optical disc, said mechanism comprising:

a magnetic head;

a magnetic head supporting member mounting said magnetic head;

an elongated plate spring member, said magnetic head supporting member being secured at an end portion in a longitudinal direction of said elongated plate spring member; and a moving system that moves said elongated plate spring member together with said magnetic head supporting member mounting said magnetic head to move between an operative position and a retracted position, wherein said magnetic head is capable of applying magnetic field to said magneto-optical disc when said magnetic head is located at said operative position, wherein said magnetic head is retracted from said operative position and spaced from said magneto-optical disc when said magnetic head is located at said retracted position, wherein said operative position and said retracted position are located between an objective lens of said disc drive and a data recording surface of said magneto-optical disc, and wherein said moving system includes:

a body member rockable about an axis that is parallel with the data recording surface of said magneto-optical disc, the other end of said elongated plate spring member being secured to said body member; and a driving system that is actuated to drive said body member to rotate so that said magnetic head is moved between said operative position and said retracted position.

10. The mechanism according to claim 9, wherein said moving system further includes a holding system that holds said body member when said driving system is deactuated, said driving system being deactuated when said magnetic head has been moved from one of said operative position and said retracted position to the other one of said operative position and said retracted position.

11. The mechanism according to claim 10, wherein said driving system includes:

a permanent magnet provided on one of said body member and said carriage, the N pole and S pole of said permanent magnet being arranged in a direction in which said body member rocks;

a magnetic field generator provided on the other of said body member and said carriage, said magnetic field generator facing said permanent magnet, said body member being biased to rotate such that said magnetic head is moved toward one of said operative position and said retracted position depending on the magnetic field generated by said magnetic field generator.

12. The mechanism according to claim 11, wherein said magnetic field generator includes:

a first magnetic member;

a second magnetic member, said first and second magnetic member being arranged along a direction in which said body member rocks, and said first magnetic member being closer to said S pole of said permanent magnet when said magnetic head is located at one of said operative position and said retracted position than a case in which said magnetic head is located at the other one of said retracted position and said operative position, said second magnetic member being closer to said N pole of said permanent magnet when said magnetic head is located at said the other of operative position and said retracted position than a case in which said magnetic head is located at said one of said operative position and said retracted position.

13. The mechanism according to claim 12, wherein when said magnetic head is located at said one of said operative position and said retracted position, said body member remains at a current position due to attractive force between said S pole of said permanent magnet and said first magnetic member, and wherein when said magnetic head is located at said the other of said operative position and said retracted position, said body member remains at a current position due to attractive force between said N pole of said permanent magnet and said second magnetic member.

14. The mechanism according to claim 8, said carriage further mounting said objective lens.

15. A magnetic head up/down mechanism for a magneto-optical disc drive, the magneto-optical disc drive recording/reproducing data on a magneto-optical disc, said mechanism being mounted on a carriage movable along a radial direction of said magneto-optical disc, said mechanism comprising:

a magnetic head;

a magnetic head supporting member mounting said magnetic head;

an elongated plate spring member, said magnetic head supporting member being secured at an end portion in a longitudinal direction of said elongated plate spring member; and a moving system that moves said elongated plate spring member together with said magnetic head supporting member mounting said magnetic head to move between an operative position and a retracted position, said moving system being located on one side with respect to data recording surface of said magneto-optical disc, wherein said magnetic head is capable of applying magnetic field to said magneto-optical disc when said magnetic head is located at said operative position, wherein said magnetic head is retracted from said operative position and spaced from said magneto-optical disc when said magnetic head is located at said retracted position, and wherein said moving system includes a body member rockable about an axis that is parallel with the data recording surface of said magneto-optical disc, the other end of said elongated plate spring member being secured to said body member, and a driving system that is actuated to drive said body member to rotate so that said magnetic head is moved between said operative position and said retracted position.

16. A magnetic head up/down mechanism for a magneto-optical disc drive, the magneto-optical disc drive recording/reproducing data on a magneto-optical disc, said mechanism being mounted on a carriage movable along a radial direction of said magneto-optical disc, said mechanism comprising:

a magnetic head;

a magnetic head supporting member mounting said magnetic head;

an elongated plate spring member, said magnetic head supporting member being secured at an end portion in a longitudinal direction of said elongated plate spring member;

a moving system that moves said elongated plate spring member together with said magnetic head supporting member mounting said magnetic head to move between an operative position and a retracted position, said moving system being located on one side with respect to data recording surface of said magneto-optical disc;

said magnetic head being capable of applying magnetic field to said magneto-optical disc when said magnetic head is located at said operative position;

said magnetic head being retracted from said operative position and spaced from said magneto-optical disc when said magnetic head is located at said retracted position;

said magnetic head being located on a data recording surface side of said magneto-optical disc;

said moving system comprising a body member rockable about an axis, the other end of said elongated plate spring member being secured to said body member; and a driving system that is actuated to drive said body member to rotate so that said magnetic head is moved between said operative position and said retracted position.

* * * * *